Sept. 13, 1966    E. C. MANDERFELD    3,272,105
EXPOSURE METER SYSTEM
Filed April 13, 1964    2 Sheets-Sheet 1
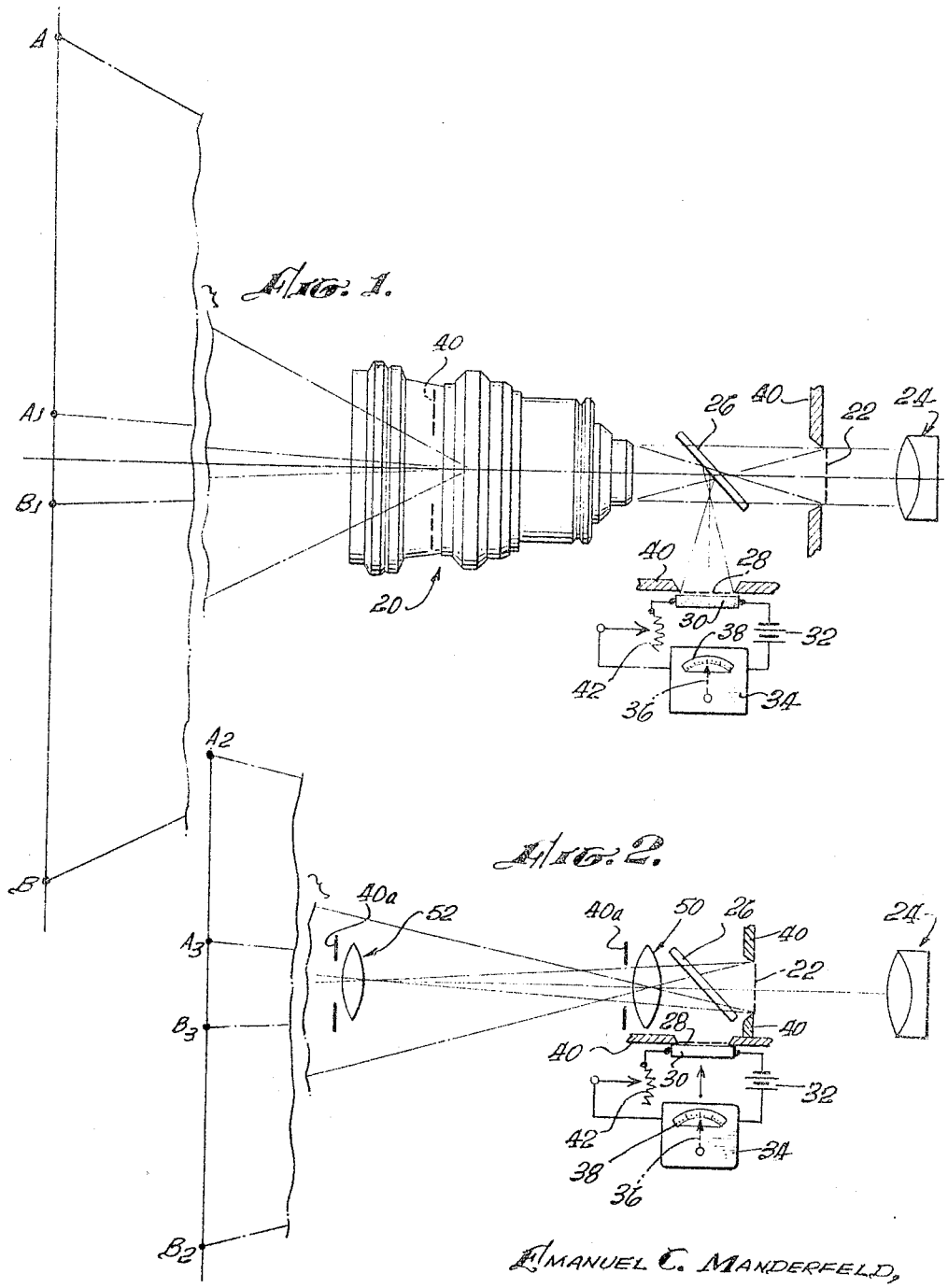

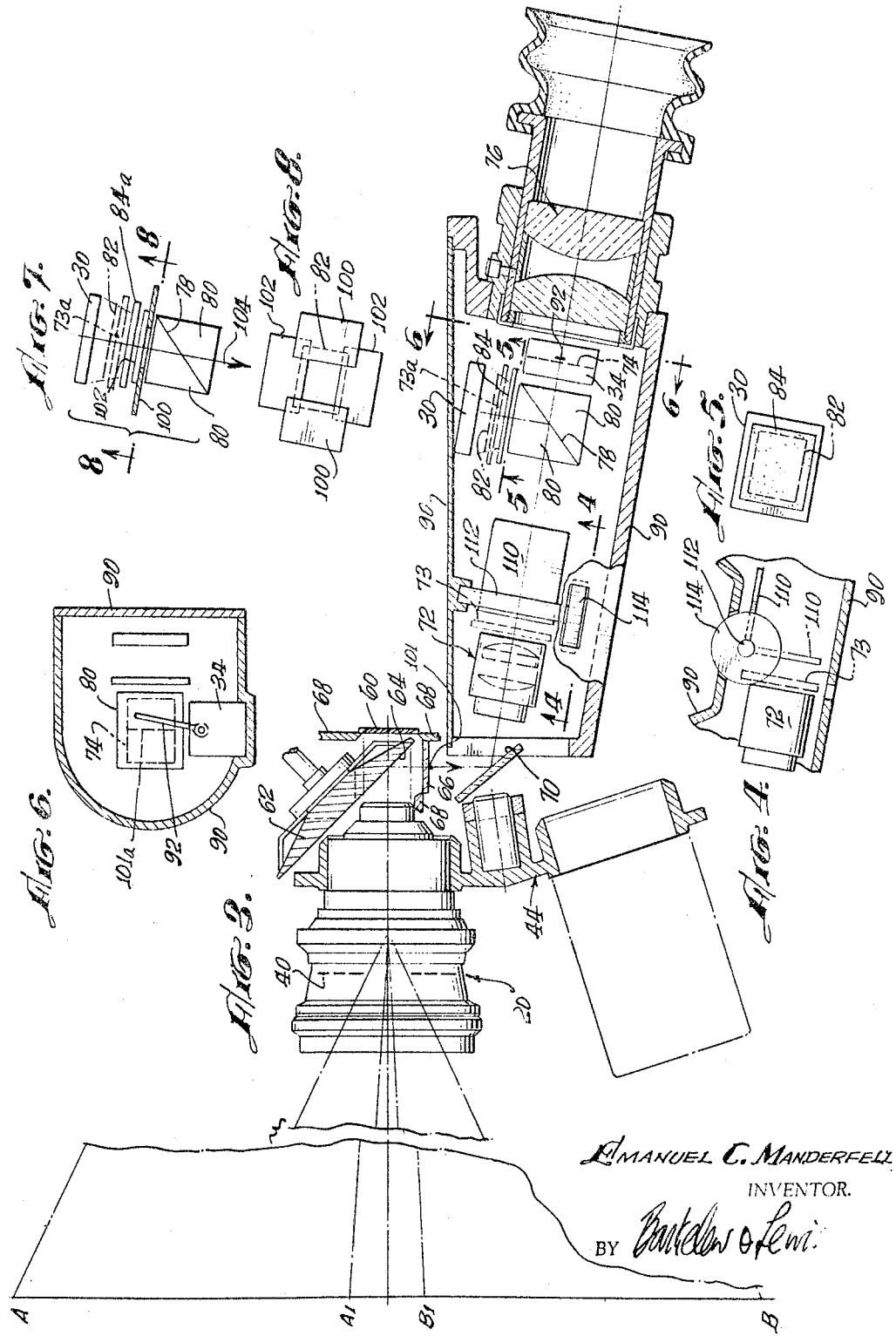

United States Patent Office 3,272,105
Patented Sept. 13, 1966

3,272,105
EXPOSURE METER SYSTEM
Emanuel C. Manderfeld, Hollywood, Calif., assignor to Mitchell Camera Corporation, Glendale, Calif., a corporation of Delaware
Filed Apr. 13, 1964, Ser. No. 359,102
1 Claim. (Cl. 95—42)

The present invention has to do with photographic exposure meter systems, its preferred typical characteristics being, among other things, simplicity, use of only a single photocell, and visibility in a view finder of the area imaged on the cell.

In general the system in a preferred form involves, in an optical view finder, successive optical projections of image of different areas of the view and its contained subject matter to be photographed, onto the same, or substantially the same, area of a single photocell, and taking indications of the cell reactions to the light beams of those successive images. Decision is then left to the photographer which, if any, of the indications, or a compromise between them, he will use as a guide for his exposures. The preferred nature of the indications is set out later.

Typical instances of views to be photographed may be, for example, in cinematographic photography involving action before or in a surrounding background, or news photography of a principle subject e.g., a person or persons in or before a surrounding background. Usually the subject matter of principle interest, or parts of such a subject, reflect light for image formation at an intensity quite different from that reflected by the surrounding ground. That ground may be relatively light or dark in reflectivity. And it is one of the features of the present invention in its most preferred form that the principle subject matter area, as well as that of the whole scene, may be very quickly imaged on substantially the same photocell area and the resulting cell reactions indicated and ascertained immediately.

In a preferred optical form a substitutable series of objective lenses of different focal lengths, or preferably an objective zoom lens which is quickly settable for different image magnifications at different angles of light acceptance without change of its image focal plane or image size, is used for casting selected images into a view finder. With either lens system the areas of the successive images looked at through an ocular, which is located preferably on the straight-through optical axis of the objective, are the same regardless of the degree of initial magnification by the objective or objectives. A semi-transparent reflector in the image forming beam reflects a part of the light laterally to form duplicate images on or at the photocell. It may be remarked here that the focal plane of this duplicate image may not necessarily be in the plane of the cell. The cell may be either in front of the image plane, or, preferably spaced behind it. In either case, and especially with an interposed diffusive transmitter such as a ground glass, the image forming light is more or less diffused over the cell area, leading to more accurate cell reaction particularly where the image varies greatly in brightness over its area. But in any case the two images, whether or not diffused on the photocell are of substantially the same area and preferably of substantially the area of the sensitive surface of the cell, so that no outlying marginal portions of the cell remain at dark reaction to modify the indication given by the cell. If anything the reactive cell surface itself may be somewhat smaller than the image areas.

Use of a zoom lens for forming the images has several marked advantages. With such a lens of fairly wide range of acceptance angle the image as seen in the view finder may quickly be accommodated, as to both location and size of subject matter to either the whole view or any selected part of it, or to the subject matter or matters of chief interest. The invention in its preferred form includes such an objective zoom lens, and further includes a camera mechanism with the image forming beam from the camera objective either selectively or intermittently reflected into the view finder. In the following detailed descriptions of various forms of the invention an optical view finder usable independently of the optics of a camera is set out, as well as one combined with a camera. In the latter form the camera is here illustratively described of the motion picture type.

Reference is made to the typical and illustrative showings in the accompanying drawings, in which:

FIG. 1 is a schematic of a view finder according to the invention, using a zoom lens;

FIG. 2 is a similar schematic illustrating the same view finder with a series of substitutable lens of different focal lengths;

FIG. 3 is a sectional view illustrating a preferred design wherein such a view finder is combined with a motion picture camera mechanism having an objective zoom lens;

FIG. 4 is a detail section on line 4—4 of FIG. 3;

FIG. 5 is a view taken as indicated by line 5—5 on FIG. 3.

FIG. 6 is a section on line 6—6 of FIG. 3;

FIG. 7 is a schematic showing a modification of parts of FIG. 3; and

FIG. 8 is a schematic on line 8—8 of FIG. 7.

Referring first to the schematics of FIG. 1, the zoom lens 20 is shown as of a ten-to-one acceptance angle range. In a fixed position such a lens casts its images all of the same size in a fixed focal plane such as is here illustrated for the image 22. That image, viewed through the ocular 24, is an image either of the whole two-dimensional field illustrated here, in one such dimension, as extending from A to B, or of the much smaller limited two dimensional subject field extending in one such dimension, say, from A1 to B1. All two dimensional fields between those two may quickly be imaged at 22, at the same image size, by the continuous and gradual adjustment of the zoom lens.

Interposed in the image forming light beam between 20 and 22 is a semi-reflective, semi-transmissive element 26 which reflects a part, say one half, of the image forming light beam to the image plane of image 28 here shown as at the sensitive surface of photocell 30. The cell is here shown as photo-conductive in series in a circuit including voltage source 32 and an indicating meter 34. Such a meter may be of the galvanometer or milliammeter type, with an indicating pointer 36 swinging over a calibrated scale 38. That scale may be calibrated for lens apertures or shutter exposure speeds, or both. Images 22 and 28 may be framed, preferably to substantially the same size and shape, by aperture plates 40, and the sensitive surface of cell 30 is preferably of substantially the same size and shape. Cell 30 may be of either the photovoltaic or photoconductive type; and the circuit between the cell and indicator may include an amplifier and/or a variable or substitutable resistance for setting the system for different film sensitivities. Illustratively a variable, settable resistance 42 is here shown. Other means of setting the system for film sensitivities are later described. The method later described is to use some means independent of the iris 40 and then to adjust that iris to an opening which brings indicator needle 36 to a set fiducial mark on the scale.

FIG. 2 illustrates schematically how a series of substitutable objectives of different focal lengths can be used to the same end. Here, for example, a short focal length and wide angle lens 50 is shown, taking in the two dimensional field from A2 to B2 in one dimension and casting its primary image at 22 and its secondary reflection image at 28 on the cell 30. Another lens 52 of longer focal length and narrower angle is shown as casting its same sized images also at 22 and 28—the images of the narrower field such as between A3 and B3. These lenses may have irises such as indicated at 40a. The general end results are similar to those in FIG. 1. For fairly easy and quick substitution an ordinary lens turret carries only three or four lenses; but not all enough to even approximate the infinite field changes of a zoom lens. Such a lens carrying turret is indicated at 44 in FIG. 3.

Optically the positions of ocular and cell 30 might be interchanged, and that is also true of the forms described below. But it is advantageous to have the ocular orientation at least generally lined up with the scene to be photographed, as here indicated.

FIGS. 3 to 6 illustrate one typical practical design where a finder system of the invention is incorporated with a camera and utilizes the zoom lens objective of the camera, here shown as a motion picture camera.

Here the zoom lens 20 is shown intermittently casting its primary image onto the focal plane of a film at 60, under control of rotating shutter 62. Shutter 62 has the usual open sector or sectors, and between them a reflective face or faces 64. Face 64 reflects the image forming beam to form an image on a ground glass or the like 66. Both the film at 60 and the ground glass at 66 may be framed to take images of substantially the same areas and shapes, by aperture plates 68. With the camera in operation the image at 66 is seen intermittently, or may be seen continuously by turning the camera over to the position where a reflective shutter face 64 is in the light beam.

The image at 66 is viewed by reflection at 70 through a finder objective 72 which casts its primary image at 74 where it is viewed through ocular 76. A semi-reflective, semi-transmissive diagonal surface 78, here shown as on the surfaces of two right angle prisms 80, lies across the image forming light beam and reflects a part of the light transversely to form a secondary image at 82 of the same size and shape as that at 74. Photocell 30 may have its sensitive surface, of substantially that same size and shape, located at the image plane 82. As shown in FIG. 3 the photocell 30 is located somewhat beyond the image plane at 82 and a diffusive transmitter 84, such as a ground glass, is shown located inside the focal plane and diffuses the light beam to form a diffused image on cell 30. Cell 30 may thus be of somewhat larger size than the undiffused image at 82, but preferably of the same shape. The cell may be framed or, in effect framed simply by the edges of its sensitive surface. Its size and shape are preferably such as to take substantially the whole of the diffused image.

The sizes and area shapes of images at 74 and 82 are fixed by the size and shape of the framed image at 66. They are here shown as somewhat larger than that at 66; but the image area at 66 being always of the same size and shape throughout adjustment of the zoom lens 20, the images at 74 and 82 are likewise always of the same size and shape. And the diffusion at 84 being fixed, the diffused images on cell 30 are likewise always of the same size and shape regardless of adjustment of lens 20 as to its reception angle. The sensitive area of cell 30 is then preferably of the same size and shape as of the diffused images falling on it.

As indicated in FIGS. 3 and 6 the cell responsive instrument 34 may be mounted in casing 90 of the view finder with its indicator needle 92 in or close to the focal plane of image 74 where it is clearly visible by ocular 76. Also at the image plane an image 101a of a fiducial mark 101 on ground glass 66 is seen through the ocular and may be used as a reference mark to note the swing of needle 92 to one side or the other. Ground glass 66 may also carry a calibration like that of FIGS. 1 and 2.

Or, if a ground glass is used for the image at 74, it may carry the reference mark and/or calibration.

As in FIGS. 1 and 2, film sensitivity is compensated by some means independent of lens iris 40, such as the resistance or resistances indicated at 42 in FIGS. 1 and 2, or possibly by an adjustable mat or iris in the optical train of lens 72. As here shown in FIGS. 3 and 4, a swinging mat 110 is mounted on a thumb wheel shaft 112 and swingable between the positions shown in FIG. 4. Thumb wheel 114 may be calibrated for film sensitivities. However such arrangements for varying the total light of the image forming beam on the optical axis of lens 72 are undesirable. The image size at both the photocell and ocular should remain the same, and the preferred method for compensating film sensitivities is either adjustable or substitutable resistances as shown at 42 in FIGS. 1 and 2, or variable or substitutable filters of different densities in that light beam. Such filters are indicated schematically at 73 in FIGS. 3 and 4, or, preferably, at 73a on the optical axis of photocell 30.

FIGS. 7 and 8 schematically show a modification of the system of FIG. 3. Here cell 30 is located relative to the semi-reflective prismatic surface 78 as in FIG. 3. A group of adjustable mats 100 and 102 is shown located in the light beam near prisms 80. Such mats may be adjusted by any suitable known means to move them in and out to form between their inner edges a clear beam passing opening of the same shape as that of the image 82, but of any size. Illustratively, an objective which casts an image of the whole scene, or a major portion of it, at 82 will be used. Diffusive transmissive element 84a lies between mats 100, 102 and cell 30. Its diffusion is such that, with any sized opening between the mats, the image forming light beam is diffused over the sensitive area of cell 30. Various means may be used for showing in an ocular the scene area to which mats 100, 102 are adjusted. For example, there may be similar mats in the focal plane at 74 connected to the mats 100, 102 to move with them in their adjustment. Or, if the transmissive element at 84a is made partially reflective, the image portion passed by mats 100, 102 may be viewed through 78 in a special ocular located on the line 104 in the direction of the arrow.

Substitutable mats with different sized openings may be used instead of the shiftable mats 100, 102. And the substitutable filters at 73a may take into account not only different film sensitivities but also the somewhat different cell reaction to image light beams of restricted image areas.

With lens iris 40, or such settable means as filters at 73 or 73a or resistance 42 set for film sensitivity compensation the different positions of indicator needle 36 or 92 on successive exposures of the cell to the image of the whole scene or a major portion of it, and to the selected subject—those different positions on such a scale as at 38 may indicate the exposure range within which the photographer makes his choice. The preferred method however is as follows.

Having set the system for film sensitivity by some means independent of the objective iris 40 or 40a, then on each of the successive exposures to, e.g., the whole scene and to the limited subject of interest, the objective iris 40 or 40a is adjusted to bring the indicator needle to such a fiducial mark as 101 or its image 101a. The relation between the sensitivities of cell 30 and instrument 34 is such that, with the needle on that fiducial mark the objective apertures are such as to give proper exposures of the film to the different scene areas taken in by the objective, assuming a fixed exposure timing such as is common in a motion picture camera operating at a given speed. The photographer then decides what iris aperture he will use within the indicated range of iris settings. If, as in stall cameras the shutter speed or exposure time is variably settable, a tabulation, which may be included in such scale calibrations as 38, may indicate to the photographer the changes in iris aperture for exposure times differing from some adopted standard time.

I claim:

An integrated motion picture camera and exposure guide system comprising in combination camera mechanism including a film aperature and an objective lens of continuously variable focal length for focusing at the film aperture a film image representing a correspondingly varying angular portion of a scene to be photographed, light sensor means having a light responsive surface of predetermined area and producing an electrical output corresponding to the brightness of illumination of that area, optical finder means having a focal plane and ocular lens means for viewing an optical image in the focal plane, optical means in the path of light from the objective lens for dividing said light to form auxiliary ocular and sensor images respectively at the finder focal plane and in position to illuminate the light responsive surface, said auxiliary images representing angular portions of the scene that correspond to the angular portion represented by the film image, visual indicating means optically positioned in the focal plane of the finder to be visible simultaneously with the ocular image and comprising fixed scale means and an element movable relative to the scale means in response to the magnitude of said electrical output, said scale means including a point that represents nominally correct film exposure.

and manually operable means for simultaneously varying in equal proportions the brightness of at least the film image and the sensor image for setting the camera exposure in accordance with the visual indicating means, whereby brightness indications are visible in the finder for a continuously variable plurality of angular scene portions simultaneously with the finder image showing such scene portion, each such brightness indication including an indication of the relation between the existing camera exposure setting and a nominally correct exposure for that scene portion.

References Cited by the Examiner

UNITED STATES PATENTS

| | | | |
|---|---|---|---|
| 3,029,689 | 4/1962 | Cech | 95—10 X |
| 3,075,440 | 1/1963 | Melle | 95—10 |
| 3,091,162 | 5/1963 | Stimson | 95—10 |
| 3,127,809 | 4/1964 | Denk | 95—10 X |
| 3,185,052 | 5/1965 | Baron | 95—10 X |
| 3,194,136 | 7/1965 | Ort | 95—10 |
| 3,205,796 | 9/1965 | Lieser | 95—10 |
| 3,212,394 | 10/1965 | Norwood | 95—10 X |

JOHN M. HORAN, *Primary Examiner.*